(12) United States Patent
Viale et al.

(10) Patent No.: US 11,645,376 B2
(45) Date of Patent: May 9, 2023

(54) DEVICE-BASED DATABASE SYSTEM

(71) Applicant: International Business Machines Corporation, Armonk, NY (US)

(72) Inventors: Joel Viale, Vence (FR); Zsolt Szalai, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 16/201,757

(22) Filed: Nov. 27, 2018

(65) Prior Publication Data
US 2020/0167459 A1 May 28, 2020

(51) Int. Cl.
*G06F 21/33* (2013.01)
*H04L 9/06* (2006.01)
*G06F 16/27* (2019.01)
*G06F 16/23* (2019.01)
*H04L 9/00* (2022.01)

(52) U.S. Cl.
CPC ........ *G06F 21/335* (2013.01); *G06F 16/2379* (2019.01); *G06F 16/27* (2019.01); *H04L 9/0637* (2013.01); *H04L 9/50* (2022.05)

(58) Field of Classification Search
CPC .................................................. G06F 21/335
See application file for complete search history.

(56) References Cited

U.S. PATENT DOCUMENTS

| | | | |
|---|---|---|---|
| 10,678,866 B1 * | 6/2020 | Ranganathan | G06F 16/211 |
| 10,754,989 B2 * | 8/2020 | Baset | G06F 11/1662 |
| 10,755,226 B1 * | 8/2020 | Robyak | G06K 7/1413 |
| 2018/0006829 A1 * | 1/2018 | Kravitz | H04L 63/0823 |
| 2018/0091596 A1 * | 3/2018 | Alvarez | H04L 67/12 |
| 2019/0125361 A1 * | 5/2019 | Shelton, IV | A61B 17/07207 |
| 2020/0079319 A1 * | 3/2020 | Zeryihun | B60R 25/01 |

FOREIGN PATENT DOCUMENTS

CN 107730279 A 2/2018

OTHER PUBLICATIONS

A. Dorri, "BlockChain: A Distributed Solution to Automotive Security and Privacy," in IEEE Communications Magazine, vol. 55, No. 12, pp. 119-125, Dec. 2017.
Anonymous, "A secure method of recording the history of a vehicle to a blockchain." IP.com Disclosure No. IPCOM000250889D, Publication Date: Sep. 12, 2017.
Anonymous, "A system and method to secure and share vehicle data." IP.com Disclosure No. IPCOM000254205D, Publication Date: Jun. 11, 2018.

(Continued)

*Primary Examiner* — Simon P Kanaan

(57) ABSTRACT

An example operation may include one or more of submitting a part replacement request to replace a first part of a device, qualifying a second part and repair resources, issue a part replacement transaction to the blockchain network, endorse the part replacement transaction by the plurality of blockchain peers, and replace the first part with the second part. The first part includes a blockchain peer of a plurality of blockchain peers and the device includes a blockchain network including a plurality of parts each corresponding to one of the plurality of blockchain peers.

20 Claims, 18 Drawing Sheets

(56) References Cited

OTHER PUBLICATIONS

Anonymous, "System and method of registering and analysing IOT vehicle parts in the external block chain datastore to guarantee safe and economic usage." IP.com Disclosure No. IPCOM000250190D, Publication Date: Jun. 9, 2017.

Anonymously, Smarter Transportation-System & Method for Temporary Transfer of Responsibility of a Vehicle to a Temporary User, IPCOM000255206D, Pub. Sep. 10, 2018.

B. Pon, "How Automakers Can Use Blockchain," Jun. 6, 2017 [Accessed Jun. 25, 2018] https://blog.bigchaindb.com/how-automakers-can-use-blockchain-adab79a6505f.

K. L. Brousmiche, "Digitizing, Securing and Sharing Vehicles Life-cycle over a Consortium Blockchain: Lessons Learned," 2018 9th IFIP International Conference on New Technologies, Mobility and Security (NTMS), Paris, 2018, pp. 1-5.

\* cited by examiner

DEVICE-BASED DATABASE SYSTEM

TECHNICAL FIELD

This application generally relates to a database storage system, and more particularly, to a device-based database system.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by centralized control and approval, which makes such a system vulnerable to tampering. As such, what is needed is a solution to overcome these significant drawbacks.

SUMMARY

One example embodiment provides a system that includes a certificate authority and a device which includes a plurality of parts each including a component peer. The device also includes a blockchain network including the plurality of component peers. One of the plurality of component peers is configured to issue a transaction to the blockchain network to one or more of: start and utilize the device, reconfigure the device, and replace a part of the device. The blockchain network is configured to endorse the transaction by the plurality of component peers.

Another example embodiment provides a method that includes one or more of submitting a part replacement request to replace a first part of a device, qualifying a second part and repair resources, issue a part replacement transaction to the blockchain network, endorse the part replacement transaction by the plurality of blockchain peers, and replace the first part with the second part. The first part includes a blockchain peer of a plurality of blockchain peers and the device includes a blockchain network including a plurality of parts that each corresponds to one of the plurality of blockchain peers.

A further example embodiment provides a non-transitory computer readable medium comprising instructions, that when read by a processor, cause the processor to perform one or more of submitting a part replacement request to replace a first part of a device, qualifying a second part and repair resources, issue a part replacement transaction to the blockchain network, endorse the part replacement transaction by the plurality of blockchain peers, and replace the first part with the second part. The first part includes a blockchain peer of a plurality of blockchain peers and the device includes a blockchain network including a plurality of parts that each corresponds to one of the plurality of blockchain peers.

DETAILED DESCRIPTION

Figure 1:
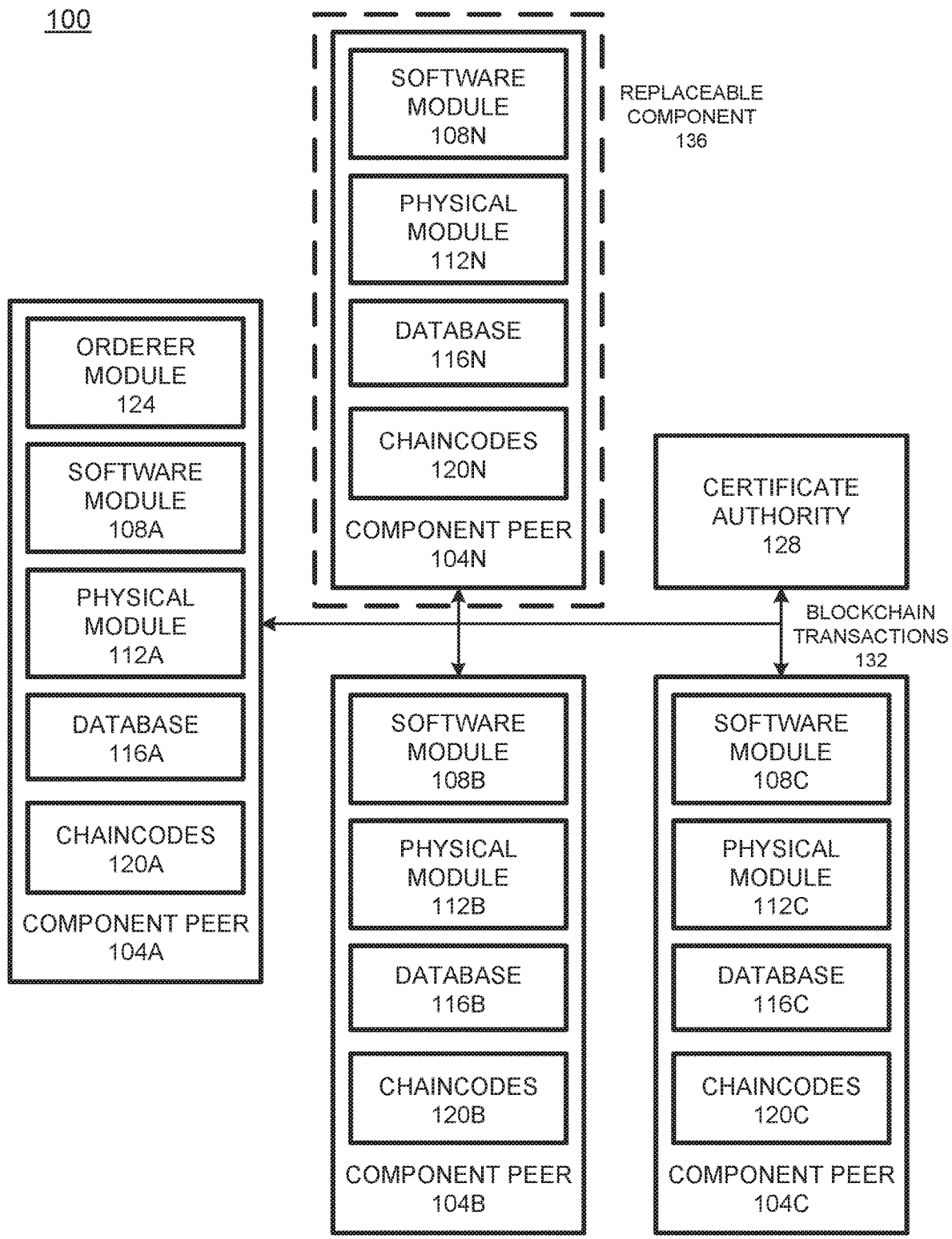
FIG. 1 illustrates a logic network diagram of a device-based blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a device-based blockchain system.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a new technical way to address issues encountered in the lifecycle and in the operation of a device which includes a plurality of parts. Examples for such device include complex machines, including vehicles. Taking the vehicle example, the new technical way consists in implementing a self-contained blockchain in each machine/vehicle. The blockchain peers are implemented on selected parts of the vehicle by the vehicle or part manufacturer; the blockchain processing hardware is tightly coupled, physically, with the part hardware in order to minimize tampering risks. This construct offers a robust interdependency between the blockchain participating parts, which can be exploited to support a variety of use cases.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. Continuing with the vehicle example, according to various aspects, the new technical way to address issues encountered in the lifecycle and in the operation of vehicles is implemented due to immutability/accountability, smart contracts/chaincodes, security, consensus, and shared ledgers—which are inherent and unique to blockchain.

In particular, with respect to immutability/accountability, storing data and recording all vehicle-related transactions in an in-vehicle blockchain creates an immutable and un-falsifiable record of the full vehicle lifecycle. Each component may be queried for obtaining a full history of the vehicle because each component carries their copy of the shared ledger. By nature of the blockchain technology, this information cannot be overridden or removed from the blockchain. The information can thus be used for accountability or operational or legal purposes.

With respect to smart contracts/chaincodes, these are blockchain features that would be leveraged for implementing an in-vehicle blockchain. They allow for the blockchain network to define business rules governing the vehicle, and to automate certain actions. Specific smart contracts or chaincodes will be developed by each vehicle manufacturer, to support their specific intent and use cases. In some embodiments, a separate chaincode may correspond to each supported transaction.

With respect to security, incorporating a permissioned blockchain within a complex machine or vehicle makes it impractical to hack, counterfeit, or steal any part of or the whole vehicle.

With respect to consensus, by construction in a permissioned blockchain the requirement to reach consensus amongst all peers (component parts of the complex machine or vehicle in this case) makes it impossible for example to hack the vehicle by replacing only one or a few parts.

With respect to shared ledgers, because each part has its own copy of the distributed, shared ledger, the entire history of data and transactions about the vehicle are available and stored in an immutable and un-falsifiable way through each part.

One of the benefits of the example embodiments is that it improves the functionality of a computing system by improving security & immutability of the data related to the vehicle. It provides an adequate environment for making vehicle processes and data significantly easier to automate and protect against tampering.

Through the blockchain system described herein, a computing system can perform functionality without a single point of compromise because of the mechanisms inherent to blockchain. For example, all transactions and transaction results are stored in an immutable shared ledger by each major component that is a blockchain peer. Tampering is readily detectable as a shared ledger would not match other shared ledgers of the blockchain network.

The example embodiments provide numerous benefits over a traditional database. For example, through the blockchain the embodiments provide new technical means to address issues encountered in the lifecycle and in the operation of vehicles. Meanwhile, a traditional database could not be used to implement the example embodiments because traditional databases utilize centralizes storage that may be tampered with and do not rely on all blockchain peers to reach consensus for new transactions. Accordingly, the example embodiments provide for a specific solution to a problem in the arts/field of complex machine management and control.

The example embodiments also change how data may be stored within a block structure of the blockchain. For example, data and transactions that will be stored in the blockchain will be specific to each vehicle manufacturer, as will be the use cases that they will choose to implement, and the parts that will be participating in the blockchain. In one use case (part replacement control), parts may be are considered worth protecting, perhaps because of the value of the replacement business, or because of safety considerations. In a second use case (adjustment of vehicle parameters to the context (e.g. to the operator or driver's profile)), the parts would be those associated with components of the vehicle that can be reconfigured; such components may have a vulnerability to hacking. The present application helps alleviate that risk by using blockchain smart contracts and consensus. Vehicle manufacturers may implement controls that would block out changes that don't fit acceptable patterns. In a third use case (anti-theft), the use case dictates what parts need to be included, i.e. the vehicle start controls (e.g., key, biometric controllers, ignition or power-on, alcohol breathalyzer). In a nominal case, peers associated with the vehicle start controllers would issue a transaction on the blockchain to indicate that their checking has been satisfactory. Peers implemented on the components that start and operate the vehicle would check for the consensus on such transactions before letting them go active. Trying to bypass controls would result in the absence of the required transaction and in a vehicle start or operation denial. The only way to start and operate the vehicle would be to physically and individually hack into each of the components that are controlled by the anti-theft function in the blockchain, which can easily be made impractical by growing the number of so-equipped components. In a fourth use case (vehicle history), blockchain peers may be implemented on components that yield data that it would be useful to collect and keep over time, starting with vehicle mileage or time of operation. Such data would be recorded, as often as required, into the blockchain shared ledger and would thereby be made immutable un-falsifiable.

Apart from the security certificates required for each peer to connect to the blockchain, the following data and transactions would be stored in the blockchain: unique identifiers, parameters specific to each part (e.g., speed limit, mileage, etc . . . ), date manufactured, date installed in the vehicle, date replaced, manufacturer, unique identifier of a mechanic who replaced the part (if applicable), etc. This data may be stored within headers, data segments, or metadata of the data block. By storing transactions including vehicle start requests, part replacement requests, change vehicle owner requests (for example, temporary ownership transfers), change driver requests, add driver requests, and adjust vehicle parameters transactions, and may be stored within data blocks of a blockchain. The data and transactions that will be stored in the blockchain specific to each vehicle manufacturer may be appended to an immutable ledger through a hash-linked chain of blocks.

Management of a vehicle is conventionally relatively static and manual. Management in this context means the configuration of the main functions of a vehicle, which may include speed management (speed limit, acceleration, traction control, etc . . . ), suspension (hard vs soft, etc . . . ), the braking system, and a mileage count. Management may be done in a limited number of ways: manually (and locally) by a person in the car (typically the driver: selecting pre-defined configurations for different types of driving such as road, race, sport, snow, mud, etc . . . ) or manually configuring each parameter, manually (and locally) by 'plugging' a control/diagnosis box (typically by a mechanic, who can usually access more functions and controls that an owner), or remotely (over-the-air: on some the most recent cars with embedded connectivity, for example).

When it comes to the embedded software within a vehicle, one of the major problems is that the access to the embedded software may be hacked, leading to the following potential threats: vehicle data may be changed (like mileage, etc . . . ), a vehicle may be remotely controlled by an unauthorized party, an identification of the vehicle may be changed, parts of the vehicle may be replaced with counterfeit parts or bad-quality parts.

Conventional systems fall short of providing needed security. Most existing methods rely on a single physical place to provide the identification, which makes it easier to hack, either physically or using software/malware. In some cases, they may be based on software methods to prevent hacking, and will thus always be vulnerable to security risks. Additionally, conventional systems do not address the question of the replacement of major parts of the vehicle (engine, chassis, wheel, tires, etc.).

FIG. 1 illustrates a logic network diagram of a device-based blockchain network, according to example embodiments. Referring to FIG. 1, the network 100 includes a plurality of major components of a device, where each of the major components is a component peer 104, shown as component peers 104A, 104B, 104C, through 104N. The device is a complex assembly or machine of inter-related parts that cooperate to control the operation of the device. In some embodiments, the device may be a vehicle of some sort including but not limited to a car, truck, motorcycle, train, ship, submarine, hovercraft, aircraft, jet, drone, or spacecraft. In other embodiments, the device may be a complex machine such as a machine tool or group of machine tools, a production line including robots, or any other form of complex machine. In one embodiment the network 100 is fully contained within the device, while in other embodiments the network 100 may have other nodes or peers outside the device itself. The network 100 is a permissioned blockchain network, such as a Hyperledger Fabric network.

When replacing a part of a device or vehicle 100, there are different risks associated with the new part replacing the current part. The main types of risks include the new part is counterfeit and typically does not provide the same level of quality and reliability compared to the part it is replacing, and the (supposedly) new part is sold as a new part but in reality is not (for example, it may have been altered by time (in case of brakes for example), by being already used, by external conditions, etc.). Again, the quality and reliability of the part is then not what is expected. The manufacturer of the new part may be a cheating person or company manufacturing lower quality parts disguised as a known brand. A mechanic may cheat in different ways such as deliberately using a counterfeited part or use a part which is not new and pretending it is new.

Uniquely, the present invention addresses these challenges by inventorying the new part into a central system, validating the new part through a traceability system, and pre-configuring the new part to be used in the target device or vehicle 100. Additionally, repair personnel must be established and verified as a trusted party. The owner (or responsible party) of the device or vehicle 100 authorizes the identified repair personnel to be a temporary user of the device or vehicle 100, and authorizes the identified repair personnel to perform the identified part(s) replacement. If a 'bad' part is put into the device or vehicle 100 instead of the expected part, it will not be accepted by the other parts and the device or vehicle 100 will stop functioning properly. Before the new part is installed into the device or vehicle 100, the physical serial number of the new part is associated with an electronic security certificate. All actions regarding the replacement of the part are logged and stored immutably in a shared ledger of the blockchain network for future reference.

Each component peer 104 includes a software module 108, a physical module 112, a database 116, and chaincodes 120. Component peer 104A includes software module 108A, physical module 112A, database 116A, and chaincodes 120A. Component peer 104B includes software module 108B, physical module 112B, database 116B, and chaincodes 120B. Component peer 104C includes software module 108C, physical module 112C, database 116C, and chaincodes 120C. Component peer 104N includes software module 108N, physical module 112N, database 116N, and chaincodes 120N. Although five component peers 104 are shown, the device may include any number of component peers 104. Although only one component is shown as replaceable 136, the components represented by the other peers may be replaceable as well.

The software modules 108 each include a connectivity module, which provides network connectivity to the entire software module and can be realized by any network technology (e.g. Wifi, Mobile Data, Bluetooth, Local Area Network, etc . . . ). Each software module 108 also includes a blockchain peer.

The physical modules 112 are the unique component that provides macro-functionality for the device, for example, an engine in a car, a painting robot on a production line, or a motor controller for a Computer Numerical Control (CNC) machine. Within each component peer 104, the software module 108 (mainly the peer in the blockchain network 100) is physically coupled with the physical module 112 (and its included sensors/actuators). With this, the only way to manage the physical module 112 (getting information from it, or acting on its parameters) is to go through the device permissioned blockchain network 100, which by nature is secure.

The databases 116 are used by the blockchain peer to store the world state of the blockchain, and are typically name-value pair databases. The databases 116 also include a blockchain transaction registry, which provides an immutable shared ledger of all the transactions done on the blockchain.

The chaincodes 120 are pieces of software code which are executed by all parties during all transactions within the network 100. A specific chaincode 120 is executed for each type of transaction. In addition to updating the world state database and the transaction registry, the result of a transaction can be: an action on the physical module 112 (e.g., changing the speed limit or the hardness of a vehicle suspension) or an event being initiated (as a result of a physical change detected by a sensor, like mileage updated). Each event and action may have a single digital representation.

Each of the component peers 104 may initiate, endorse, and commit blockchain transactions 132. However, one component peer 104 also serves as an orderer, which orders blockchain transactions 132 into new blocks to be stored in the blockchain (shared ledger of databases 116). FIG. 1A shows component peer 104A including an orderer module 124 to perform the orderer function, however any such component peer 104 may perform this function.

Network 100 also includes a certificate authority 128, which is responsible for delivering and verifying digital security certificates, verifying the validity of the certificates for systems that submit transactions 132 to or read information from the blockchain, and verifying the validity of the certificates of the blockchain peers 104 when they evaluate a proposed transaction 132.

The present application applies blockchain technology to complex devices that include a plurality of parts, of which vehicles constitute an example, with the following important and unique characteristics: each major part of the vehicle is a peer in an 'in-vehicle' blockchain, the physical management of the part (typically through sensors and actuators) is physically coupled with one or more software programs representing the peer, pre-defined one-to-one relationship between physical events and actions (sensors and actuators) are provided with their software counterparts for each type of part, a vehicle as a whole is made up of a network of all its parts, and will not function properly if one of the parts is missing, defective, counterfeited or hacked, any change to a vehicle cannot be done without the consensus of all the major parts (peers in the blockchain). The present application collaboratively provides immutable, trustable and automated management of the vehicle by using the concepts of permissioned blockchain technology including Hyperledger Fabric blockchain technology or Ethereum.

The proposed solution has a number of unique benefits, amongst which include trustable and immutable management of a vehicle and each major part, and highly secured, dynamic and automated management of the vehicle. With the physical coupling between the physical world (the part itself) and the software (the blockchain), it completely removes any potential security breach between the physical object and the blockchain, which is one of the main security issue in the Internet-of-Things domain. Several use cases are readily apparent, such as safe replacement or repair of any of the major device part by consensus from all the other parts and with proper access control, automated management of the main functions of the vehicle (e.g. speed limit, braking system, suspension, mileage, driver identification), chaincodes or smart-contracts executed, with the proper consensus algorithm, when executing pre-defined actions on the vehicle, including transfer of ownership/drivership, change/repair of major parts or assemblies, revisions, recall campaigns, etc., and full lifecycle management of the whole vehicle or device from any of its major parts.

Figure 2A:
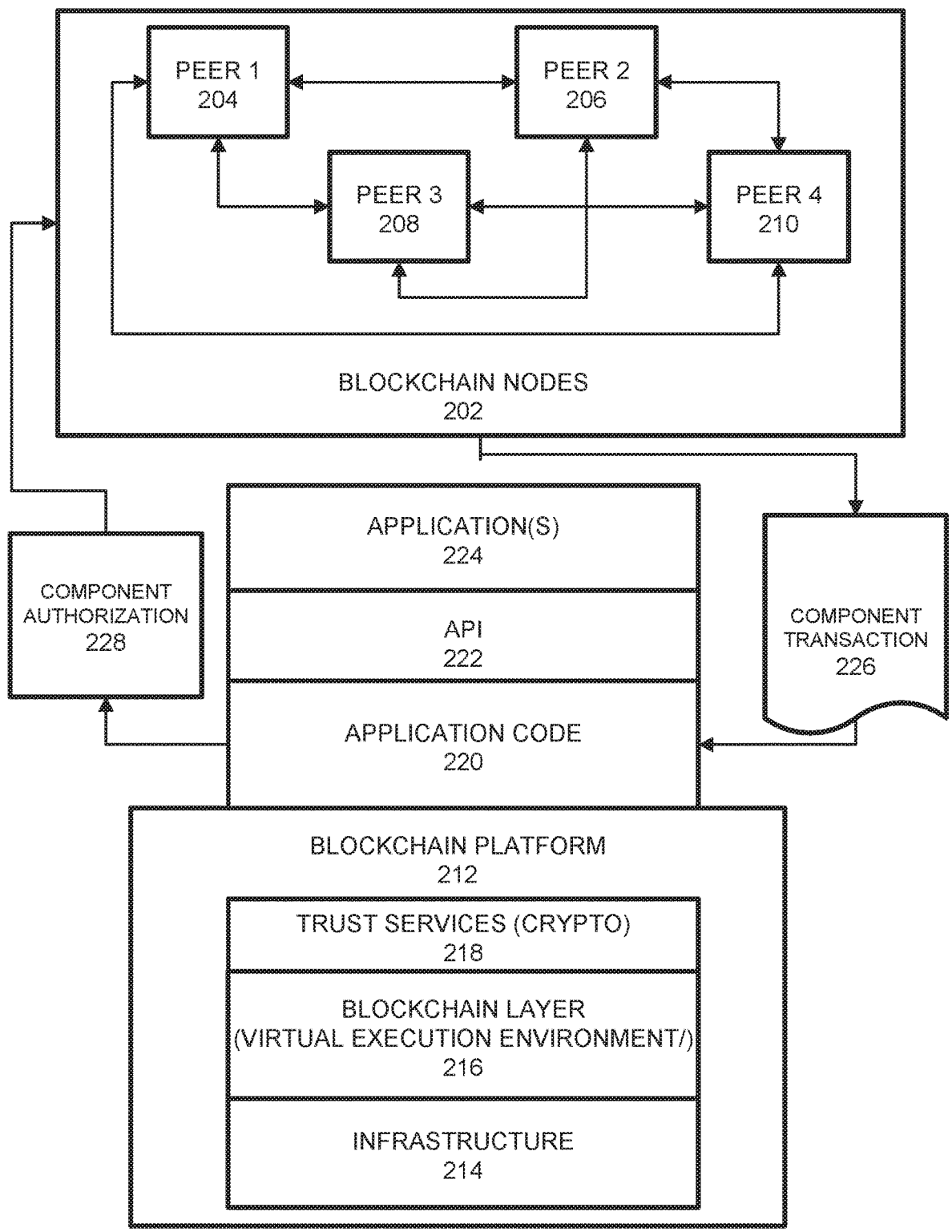
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include various component transactions such as a request to replace a component of the vehicle 100 or change a driver to a transferee 158. Component transactions 226 may be processed by one or more processing entities (e.g., virtual machines) included in the blockchain layer 216. The result 228 may include a request for component authorization. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain platform 212 may receive a blockchain transaction 226 to replace a part or initiate a change of driver for the vehicle 100. One function may be to request authorization for either the part replacement or the change in driver as a component authorization 228, which may be provided to one or more of the nodes 204-210.

Figure 2B:
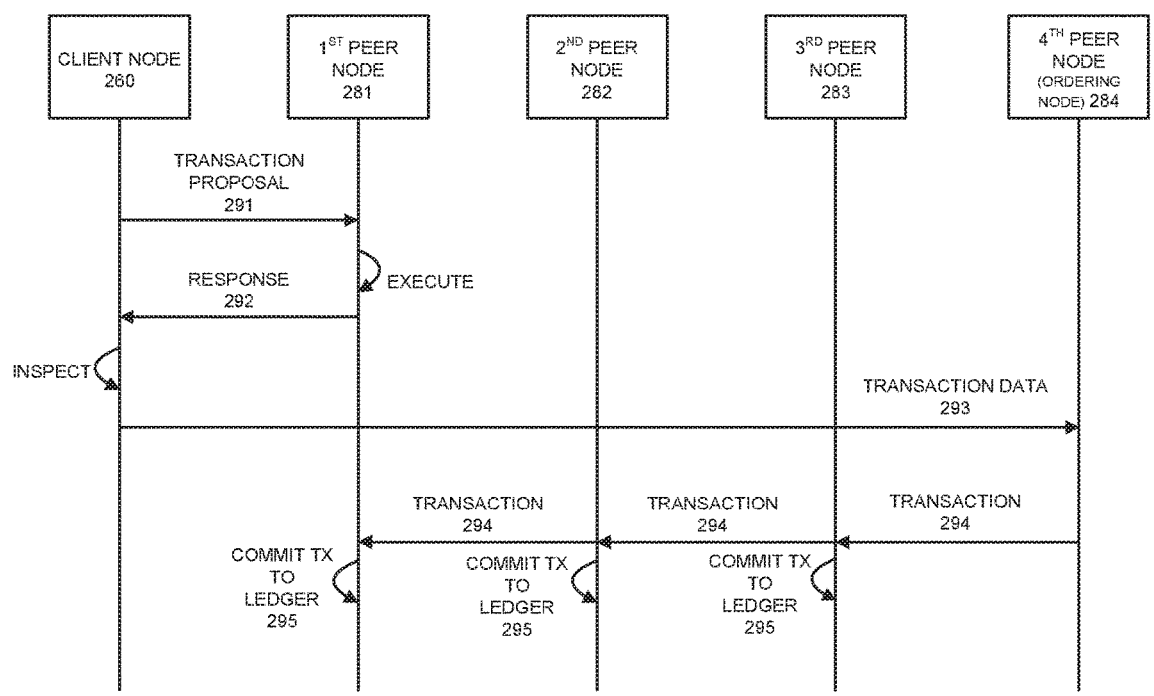
FIG. 2B illustrates a sequence diagram that depicts a consensus mechanism, according to example embodiments.

FIG. 2B illustrates an example of a sequence diagram that depicts a consensus mechanism 250 between nodes of the blockchain in accordance with an example embodiment. Referring to FIG. 2B, the consensus mechanism may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
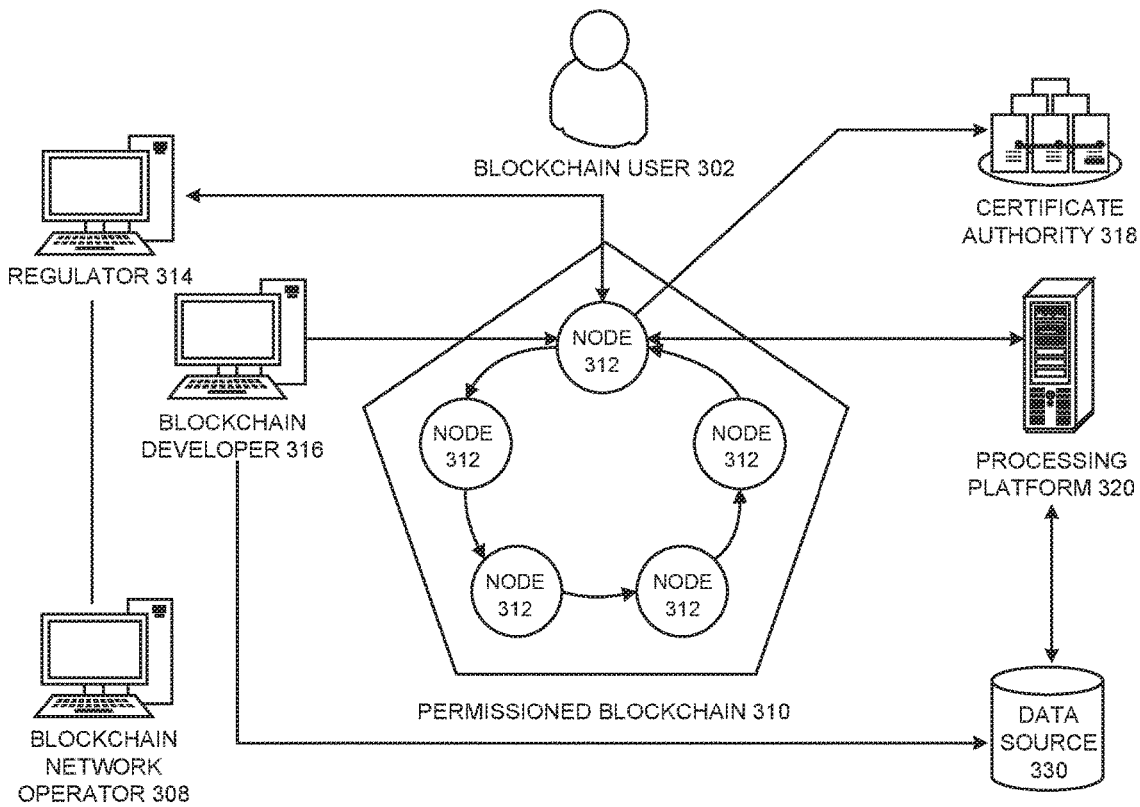
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manages member permissions, such as enrolling the regulator system 314 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through an interface (such as a REST interface or other interface configured to deploy chaincode). To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
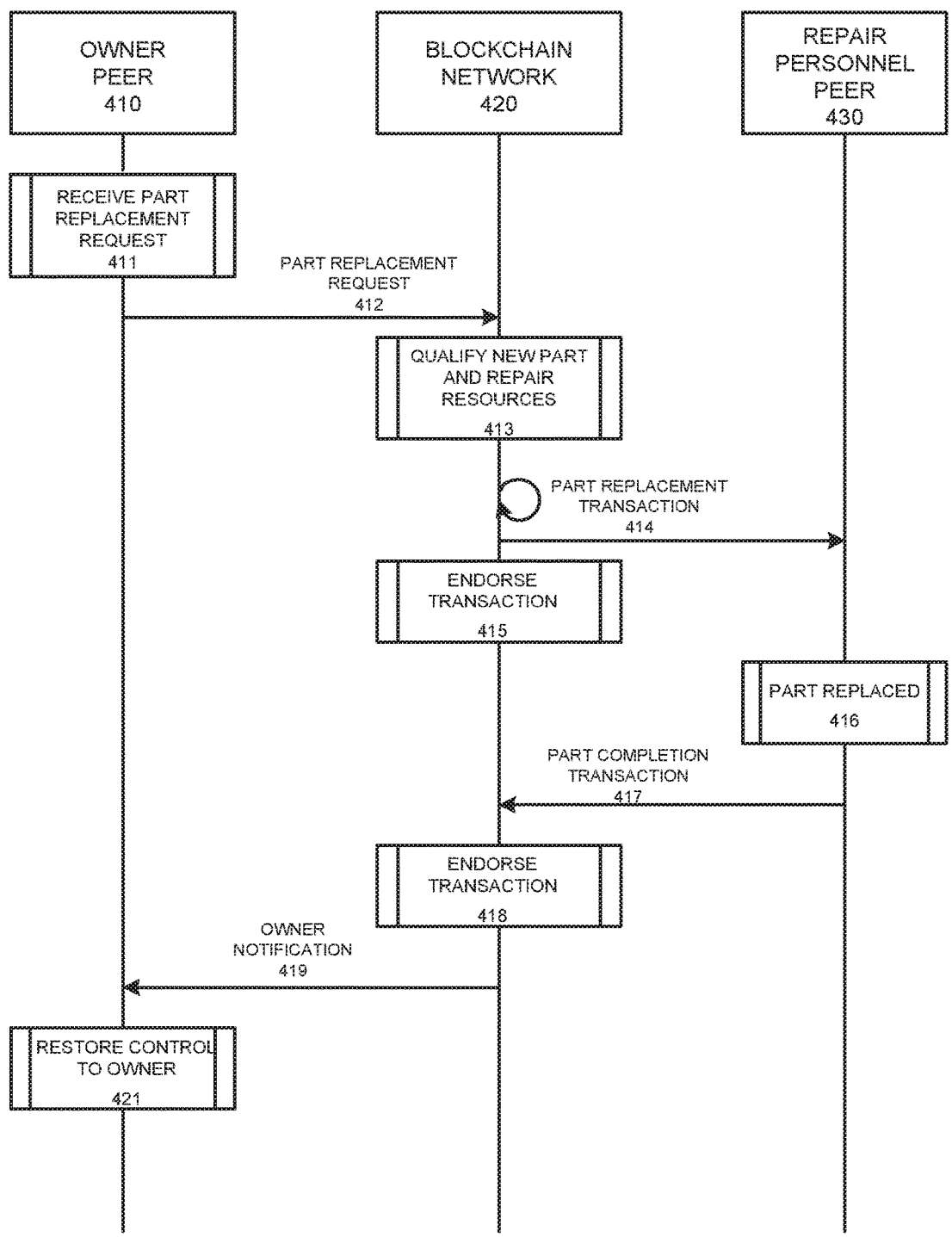
FIG. 4A illustrates a system messaging diagram for performing a part replacement for a device, according to example embodiments.

FIG. 4A illustrates a system messaging diagram for performing a part replacement for a device, according to example embodiments. Referring to FIG. 4A, the system diagram 400 includes an owner peer 410, a blockchain network 420, and a repair personnel peer 430. The owner peer 410 has responsibility for the device, which is a complex device which includes a plurality of component peers 104.

The owner peer 410 receives a part replacement request 411 from the device. In some embodiments, the part replacement request 411 is received after a component peer 104 of the device fails. In other embodiments, the device includes predictive failure capabilities that predict failure of a component peer 104 before the component peer 104 actually fails, based on component peer 104 behavior and analytics. In yet another embodiment, the owner peer 410 is taking the device for a maintenance activity and desires to unlock the blockchain and allow a maintenance facility to perform part replacements. The owner peer 410 then transmits a part replacement request 412 to the blockchain network 420.

After receiving the part replacement request 412, the blockchain network 420 qualifies the new part and repair resources 413 to perform the part replacement. Once the new part and repair resources have been qualified, the blockchain network 420 generates a part replacement transaction 414 to a repair personnel peer 430. In response to receiving the part replacement transaction 414, the transaction is endorsed 415 and the repair personnel peer 430 replaces the specified part in the device 416 with a new part, and generates a part completion transaction 417 to the blockchain network 420 to signify the part replacement has been satisfactorily completed.

The blockchain network 420 endorses the transaction 418 and provides a notification 419 to the owner peer 410 that the part replacement has been satisfactorily completed. Finally, the owner peer 410 restores control of the device back to the owner 421.

Figure 4B:
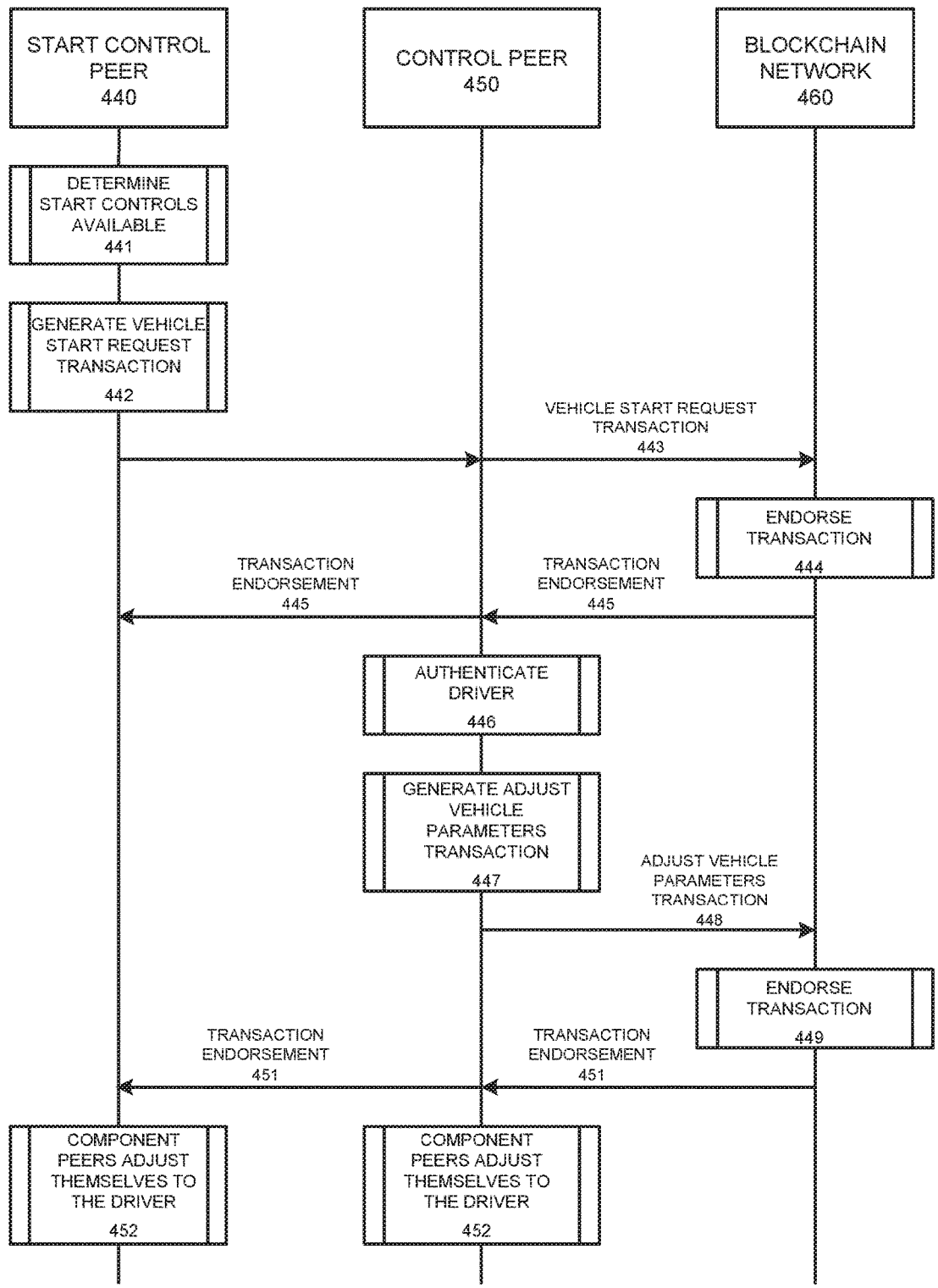
FIG. 4B illustrates a system messaging diagram for adjusting vehicle parameters corresponding to a driver, according to example embodiments.

FIG. 4B illustrates a system messaging diagram for performing adjusting vehicle parameters corresponding to a driver, according to example embodiments. Referring to FIG. 4B, the system diagram 435 includes a start control peer 440, a control peer 450, and a blockchain network 460. The device is a complex device which includes a plurality of component peers 104.

The start control peer 440 determines if start controls are available 441, and which available start controls may be identified. Once the available start controls have been identified, the start control peer 440 generates a vehicle start request transaction 442 to the blockchain network 460. All peers of the blockchain network 460 endorse the transaction 444, and the transaction results are committed to the shared ledger of the blockchain network.

In response to receiving the transaction endorsement 445, a control peer 450 authenticates a driver of the vehicle 446. Once the driver has been authenticated 446, the control peer 450 generates an adjust vehicle parameters transaction 447 and provides the adjust vehicle parameters transaction 448 to the blockchain network 460. Once again, all peers of the blockchain network 460 endorse the transaction 448, and the transaction results are committed to the shared ledger of the blockchain network.

The blockchain network provides the endorsed transaction 451 to the start control peer 440 and the control peer 450 as well as all other component peers 104, which in response adjust themselves to the driver 452 according to local functionality associated with each peer. In this way, a vehicle may be personalized to a driver using blockchain technology.

Figure 4C:
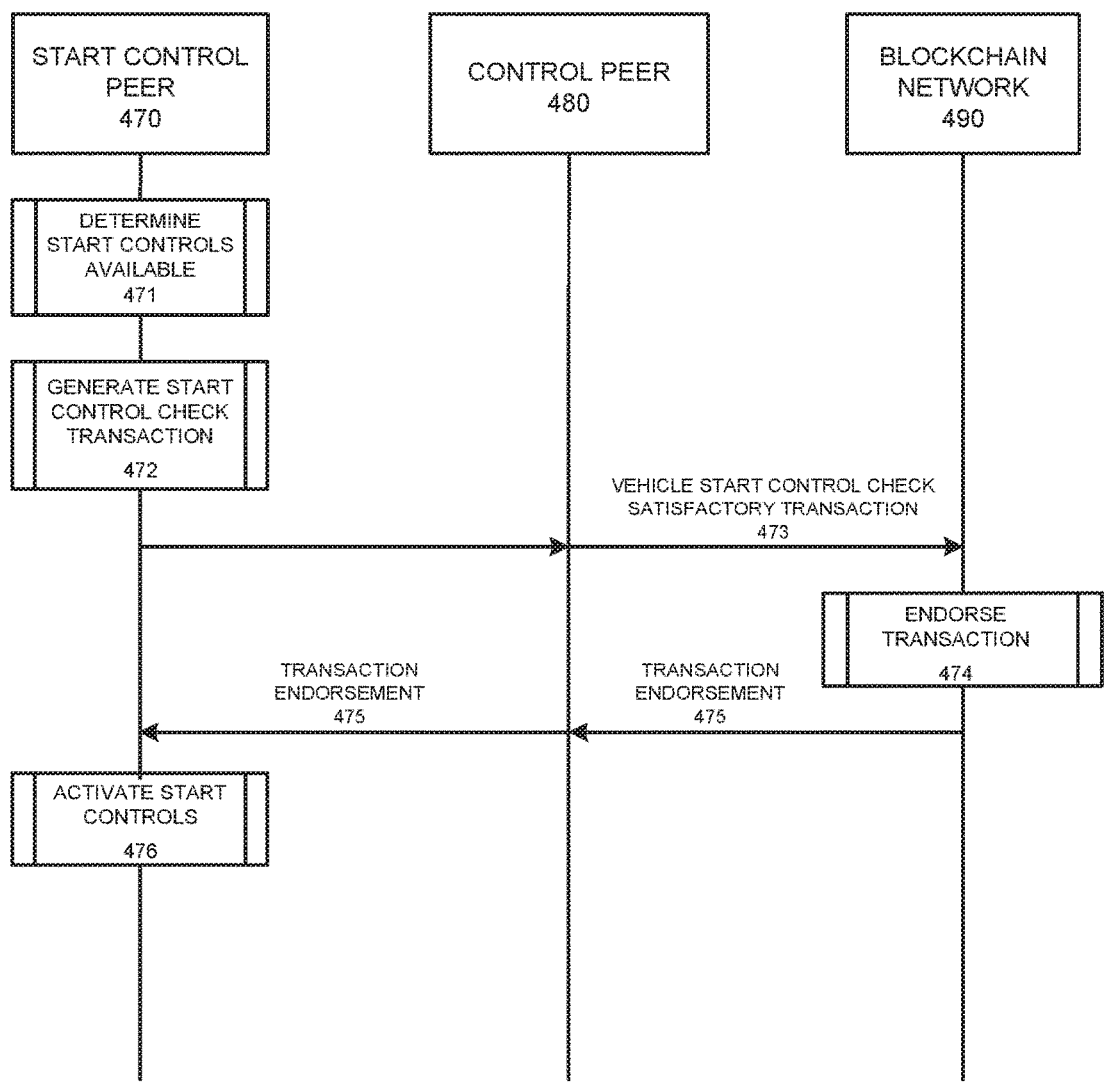
FIG. 4C illustrates a system messaging diagram for performing theft prevention for a vehicle, according to example embodiments.

FIG. 4C illustrates a system messaging diagram for performing theft prevention for a vehicle, according to example embodiments. Referring to FIG. 4C, the system diagram 465 includes a start control peer 440, a control peer 480, and a blockchain network 490. The device is a complex device which includes a plurality of component peers 104.

The start control peer 470 determines if start controls are available 471, and which available start controls may be identified. Once the available start controls have been identified, the start control peer 470 generates a start control check transaction 472 to the blockchain network 490. All peers of the blockchain network 490 endorse the transaction 474, and the transaction results are committed to the shared ledger of the blockchain network 490.

In response to receiving the transaction endorsement 475, the start control peer 470 activates start controls 476 for the vehicle. The start controls may include an ignition switch, disabling an alarm, enabling a battery connection, or any other component 104 activations required to start the vehicle.

Figure 5A:
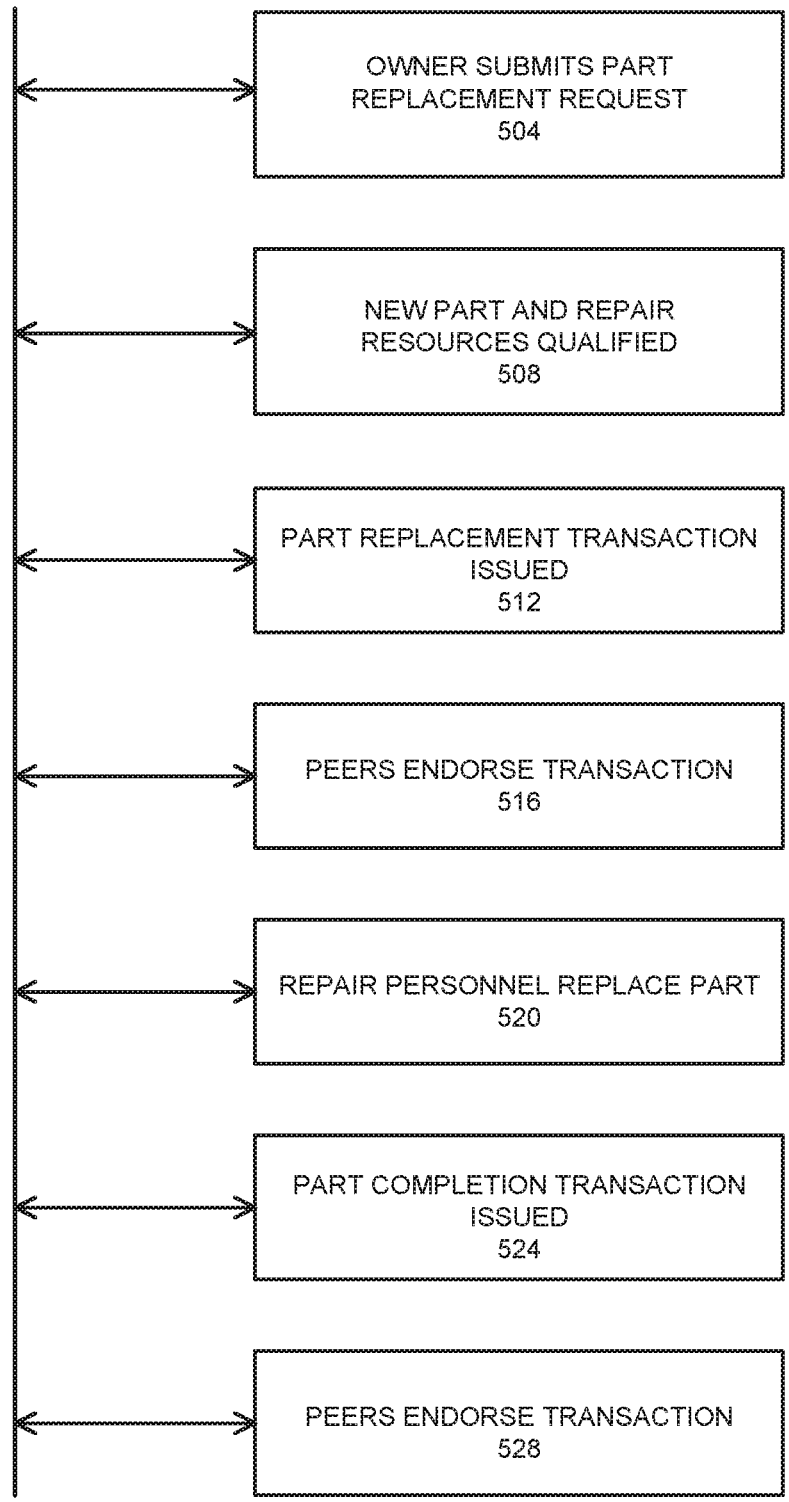
FIG. 5A illustrates a flow diagram of an example method of replacing a component peer part in a blockchain, according to example embodiments.

FIG. 5A illustrates a flow diagram 500 of an example method of replacing a component peer part in a blockchain, according to example embodiments. Referring to FIG. 5A, the method 500 may include one or more of the following steps.

At block 504, an owner 154 submits a part replacement request. The part is a component peer 104 of a device-level blockchain network.

At block 508, new part and repair resources are qualified.

At block 512, a part replacement transaction is issued to the blockchain network.

At block 516, all peers 104 of the blockchain network endorse the part replacement transaction, and the part replacement transaction is ordered 124 by a component peer 104A into a new block to be appended to the blockchain.

At block 520, the repair personnel qualified in block 508 replace the part designated by the part replacement transaction.

At block 524, a part completion transaction is generated by the repair personnel to the blockchain network.

At block 528, the peers 104 endorse the part completion transaction, and the part completion transaction is ordered 124 by a component peer 104A into a new block to be appended to the blockchain.

Figure 5B:
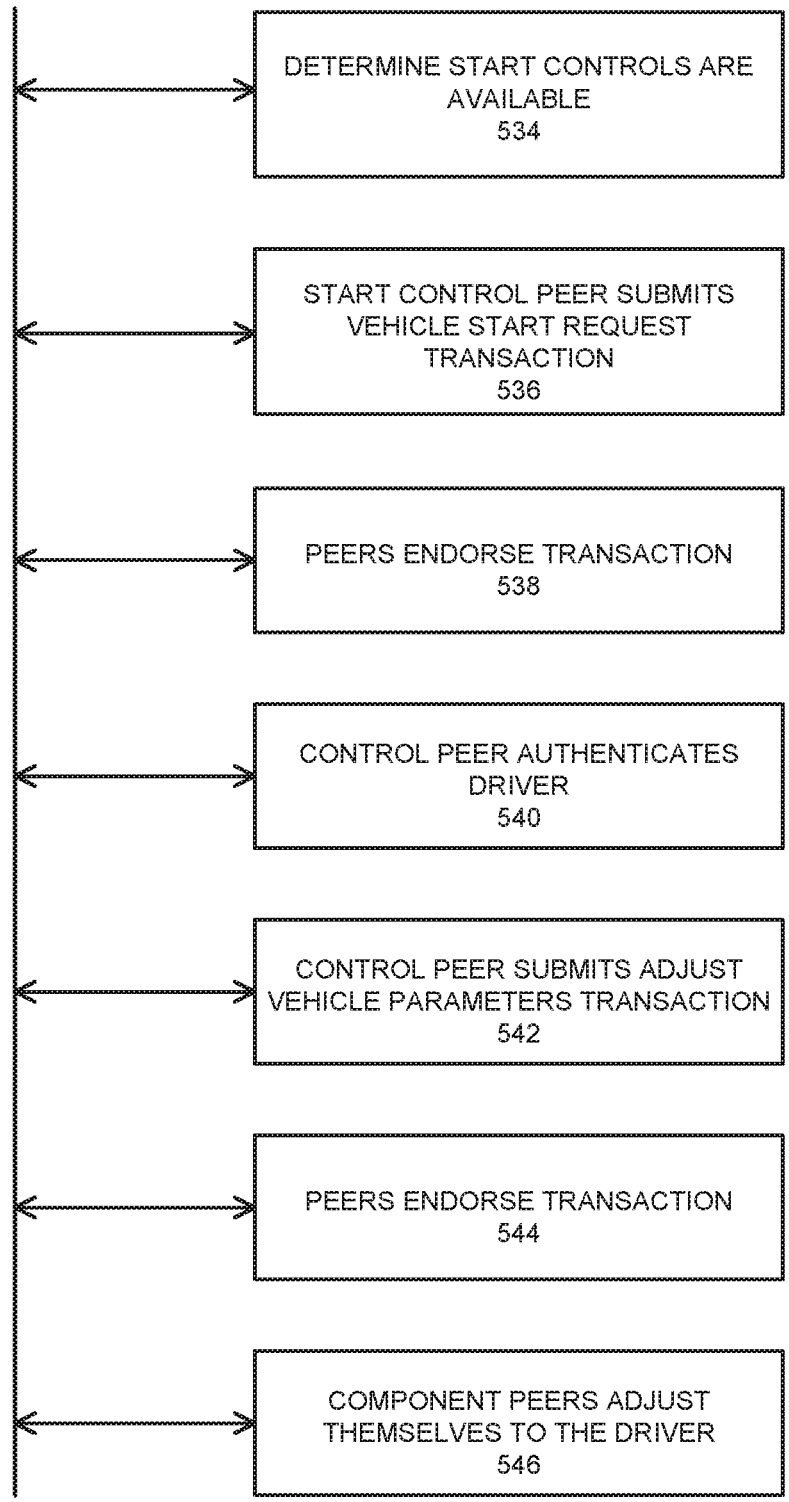
FIG. 5B illustrates a flow diagram of an example method of performing adjusting vehicle parameters corresponding to a driver, according to example embodiments.

FIG. 5B illustrates a flow diagram 532 of an example method of performing adjusting vehicle parameters corresponding to a driver, according to example embodiments. Referring to FIG. 5B, the method 532 may include one or more of the following steps.

At block 534, any available start controls are determined by the start control peer 440. The start control peer 440 is a component peer 104 of a device-level blockchain network. The start controls would be those associated with components of a vehicle that may be reconfigured; such components can come with a vulnerability to hacking. This embodiment helps alleviate that risk. By using blockchain smart contracts and consensus, a vehicle manufacturer can implement controls that would block out changes that don't fit acceptable patterns.

At block 536, the start control peer 440 submits a vehicle start request transaction to the blockchain network.

At block 538, all component peers 104 of the blockchain network endorse the vehicle start request transaction. Endorsed transactions are stored to the shared ledger.

At block 540, a control peer 450 authenticates a driver of the vehicle. In one embodiment, a potential driver validates their identity using one or more biometric sensors of the vehicle.

At block 542, the control peer 450 submits an adjust vehicle parameters transaction to the blockchain network.

At block 544, all component peers 104 of the blockchain network endorse the adjust vehicle parameters transaction. Endorsed transactions are stored to the shared ledger.

At block 546, the component peers 104 having adjustable parameters adjust themselves to the driver.

Figure 5C:
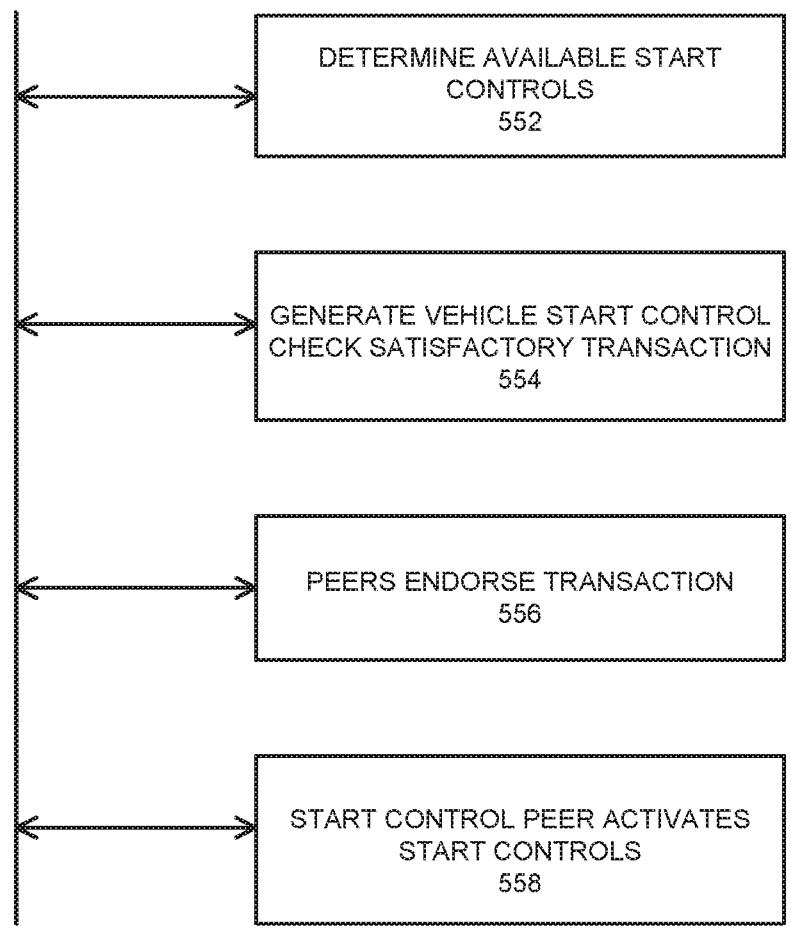
FIG. 5C illustrates a flow diagram of an example method of performing theft prevention for a vehicle, according to example embodiments.

FIG. 5C illustrates a flow diagram 550 of an example method of performing theft prevention for a vehicle, according to example embodiments. Referring to FIG. 5C, the method 550 may include one or more of the following steps.

At block 552, a start control peer 470 determines all available start controls for a vehicle. The start control peer 470 is a component peer 104 of a device-level blockchain network. Available start controls may include a key, biometric controllers, ignition or power-on modules, an alcohol breathalyzer, etc.): in the nominal case, the component peers 104 associated with the vehicle start controllers would issue a transaction to the blockchain to indicate that their checking has been satisfactory; the peers implemented on the components that start and operate the vehicle would check for the consensus on such transactions before letting them go active. Trying to bypass controls would result in the absence of the required transaction and in a vehicle start or operation denial. The only way to still start and operate the vehicle would be to physically and individually hack into each of the component peers 104 that are controlled by the anti-theft function in the blockchain, which can easily be made impractical by growing the number of so-equipped components.

At block 554, the start control peer 470 generates a vehicle start control check satisfactory transaction to the blockchain network.

At block 556, all component peers 104 of the blockchain network endorse the vehicle start control check satisfactory transaction. Endorsed transactions are stored to the shared ledger.

At block 558, the start control peer 470 activates start controls for the vehicle, and the vehicle is able to be operated in an authorized manner.

Figure 5D:
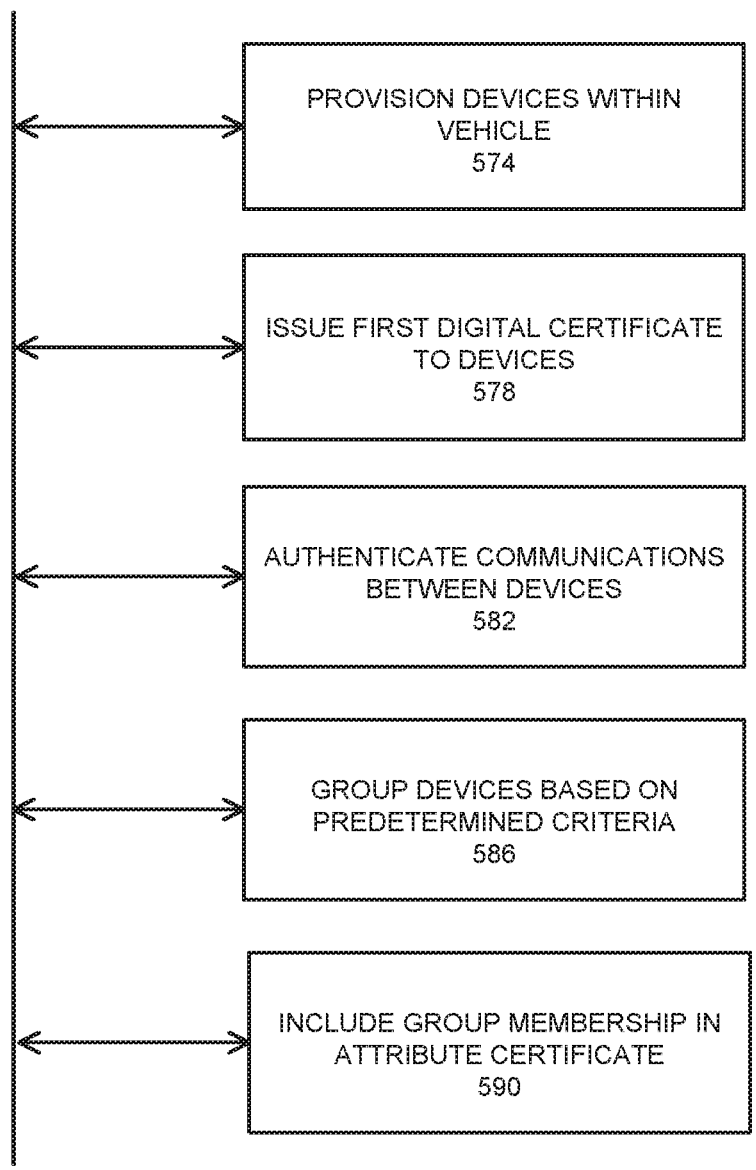
FIG. 5D illustrates a flow diagram of an example method of establishing secure communication between in-device objects, according to example embodiments.

FIG. 5D illustrates a flow diagram 570 of a method of establishing secure communication between in-device objects, according to example embodiments. The method may include one or more of the following steps.

At block 574, first and a second objects may be provisioned by providing a unique identification, a digital identity token and a cryptographic key to and authenticating each of the first and second objects. The provisioning may be performed at the time of manufacturing a product that includes some objects, at the time of installing the object within the product, at the time of programming the product or the objects, or at any time before establishing the communication between the objects at issue. In either case, the objects at issue would have a unique identification and a cryptographic key and are authenticated before they establish a secure communication line.

At block 578, a first digital certificate is issued to the devices, for example, by a trusted third party, such as an attribute authority (AA). A first object invites a second object to establish a (unsecure) communication line with the first object by receiving a digital token from the second object.

At block 582, the second object is authenticated to the first object using the unique identification, the digital identity token, and cryptographic key of the second object. A secure communication line between the first object and the second object is established by authenticating the unsecured communication line using a second digital certificate provide to the communication line between the first object and the second object. This way, the security ecosystem not only issues (first) certificates to objects (endpoints), but it also issues (second) certificates to each authenticated communication line that pairs of objects (endpoints) have established and use.

At block 586, devices are grouped based on predetermined criteria. In some embodiments, a group defines function and/or role, such an external-facing sensors group, groups or subgroups of devices on a CAN bus, all devices within a vehicle, endpoints, and external entities that are responsible for maintaining designated vehicles. An active group may include as few as one active member. A group administrator is considered a member of the group.

Finally, at block 590, group membership is included in an attribute certificate. An attribute certificate for the group indicates group characterization (e.g., external facing sensors group, vehicle(s), department(s) and/or role(s)), and references a public key certificate that includes a signature verification public key. The corresponding signature generation private key is held by the group administrator. For example, in the case of a vehicle this may be a master device management entity (e.g., an IoT entity, a CIoT device, etc.) which may be controlled by a human or an artificial intelligence capability. For example, in the case of a vehicle maintenance group this may be a designated endpoint computing device which may be controlled by a human or an artificial intelligence capability. This key is used to assign the group public key that is used for encryption or key establishment. This mechanism enables the group administrator to (re-) assign values to the group public key as long as the attribute certificate (or its replacement) is currently valid and the signature verification public key has not been revoked.

Figure 6A:
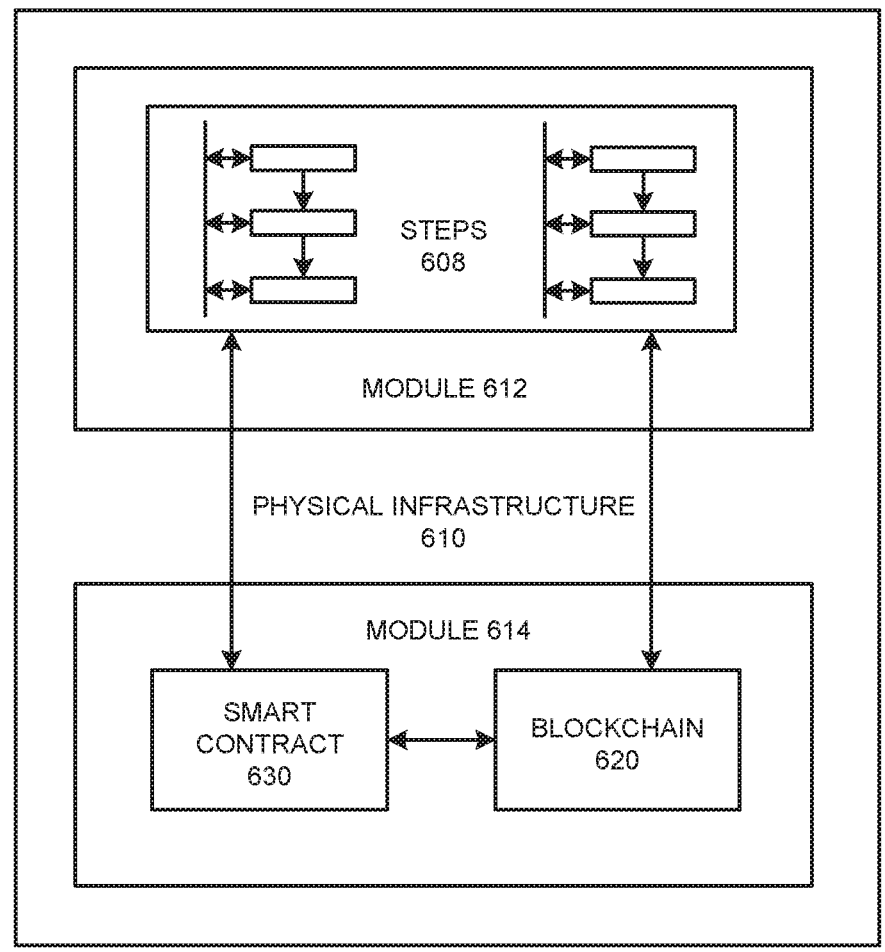
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
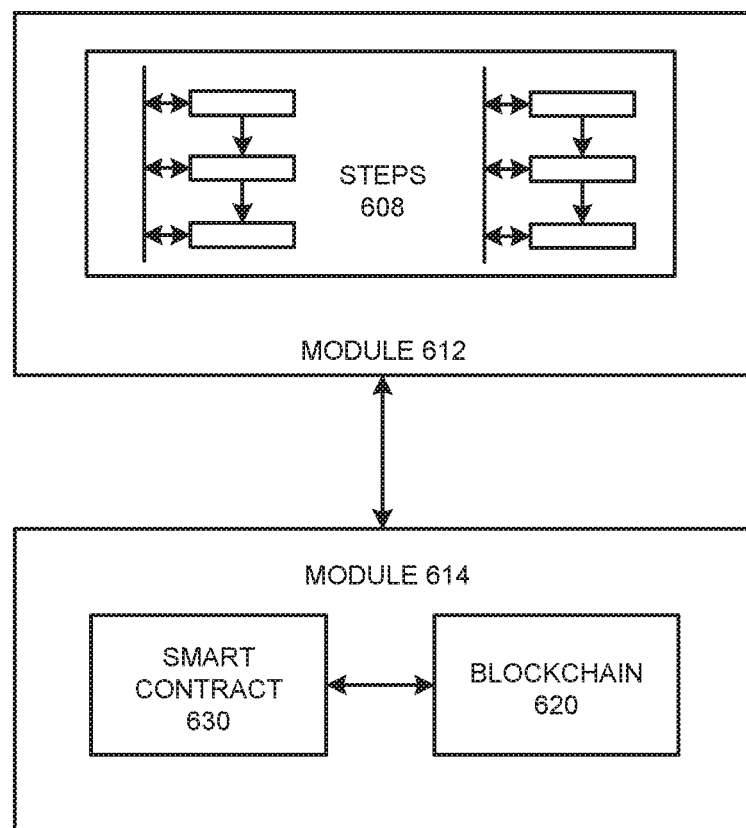
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The module 612, and the module 614 may include one or more computers, servers, processors, memories, and/or wireless communication devices. Further, the module 612 and the module 614 may be a same module.

Figure 6C:
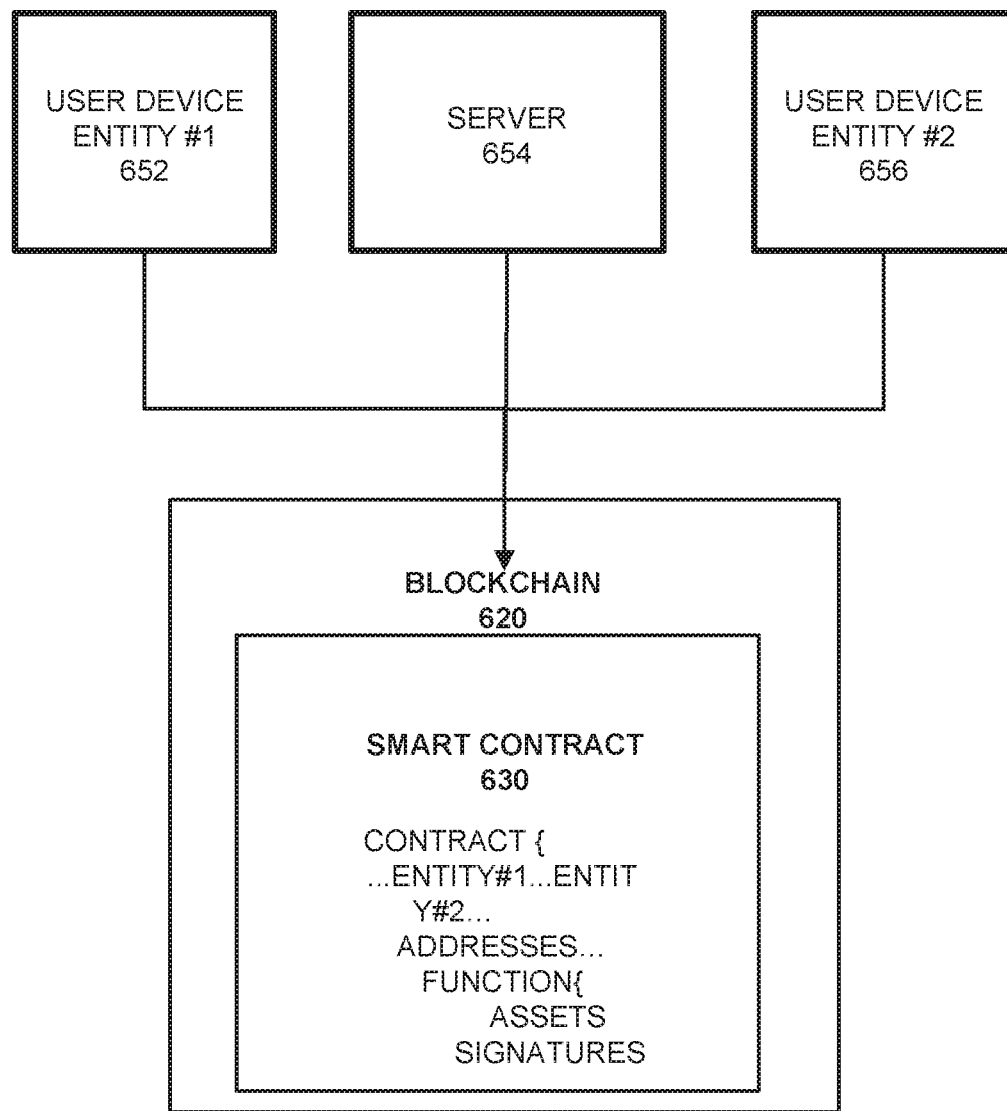
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
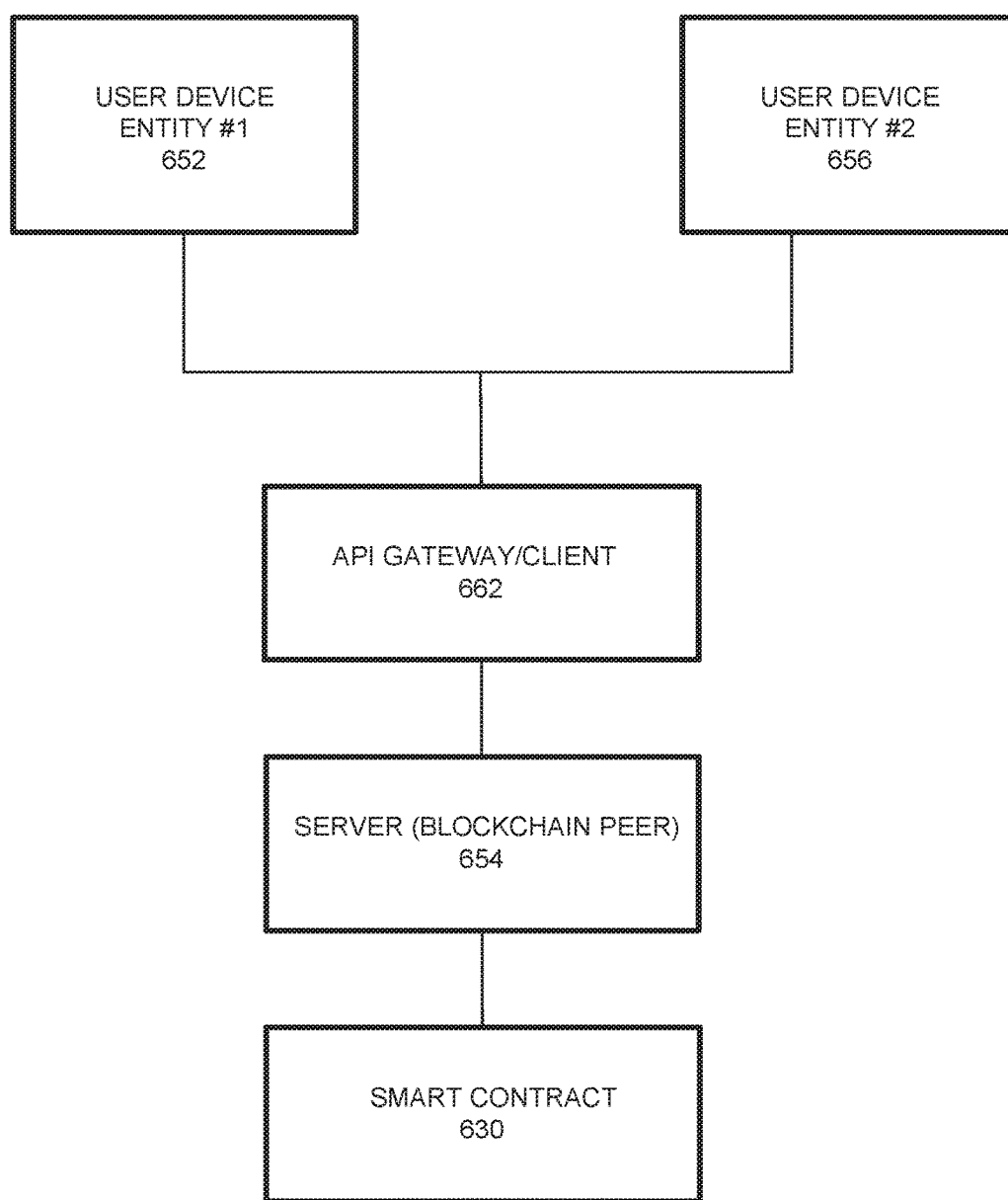
FIG. 6D illustrates an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
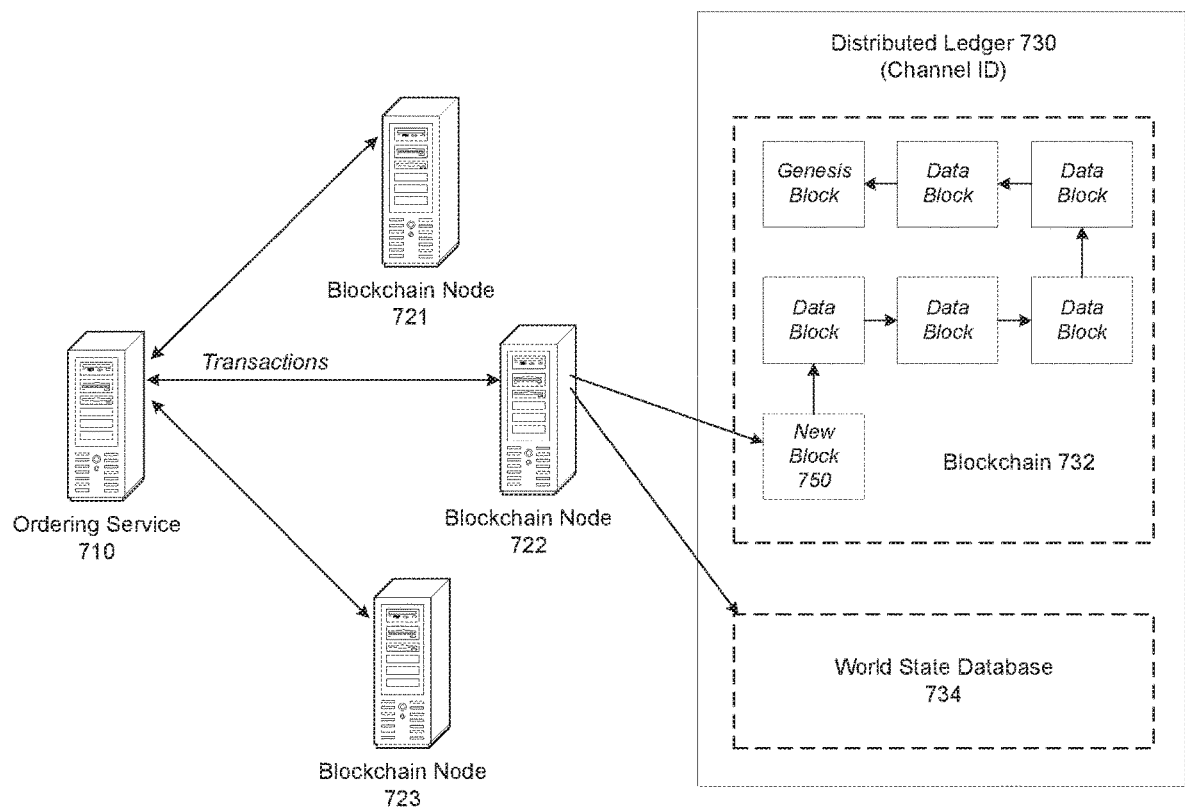
FIG. 7A illustrates a process of new data being added to a database, according to example embodiments.
Figure 7B:
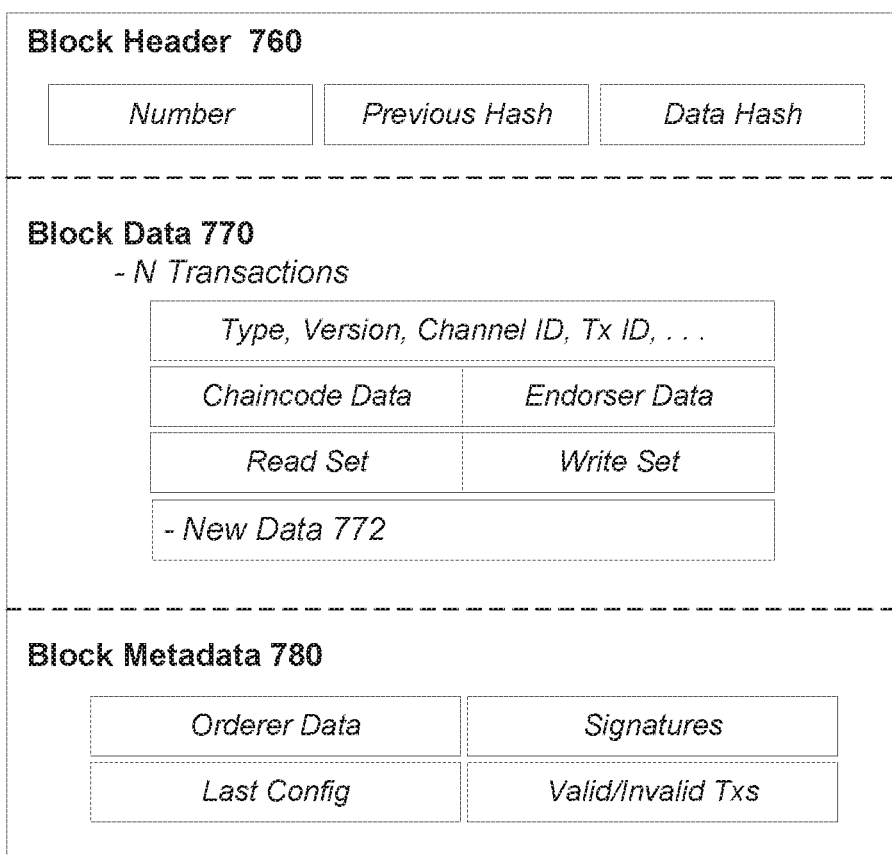
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, a vehicle unique identifier, a part identifier, a vehicle owner identifier, a vehicle transferee identifier, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
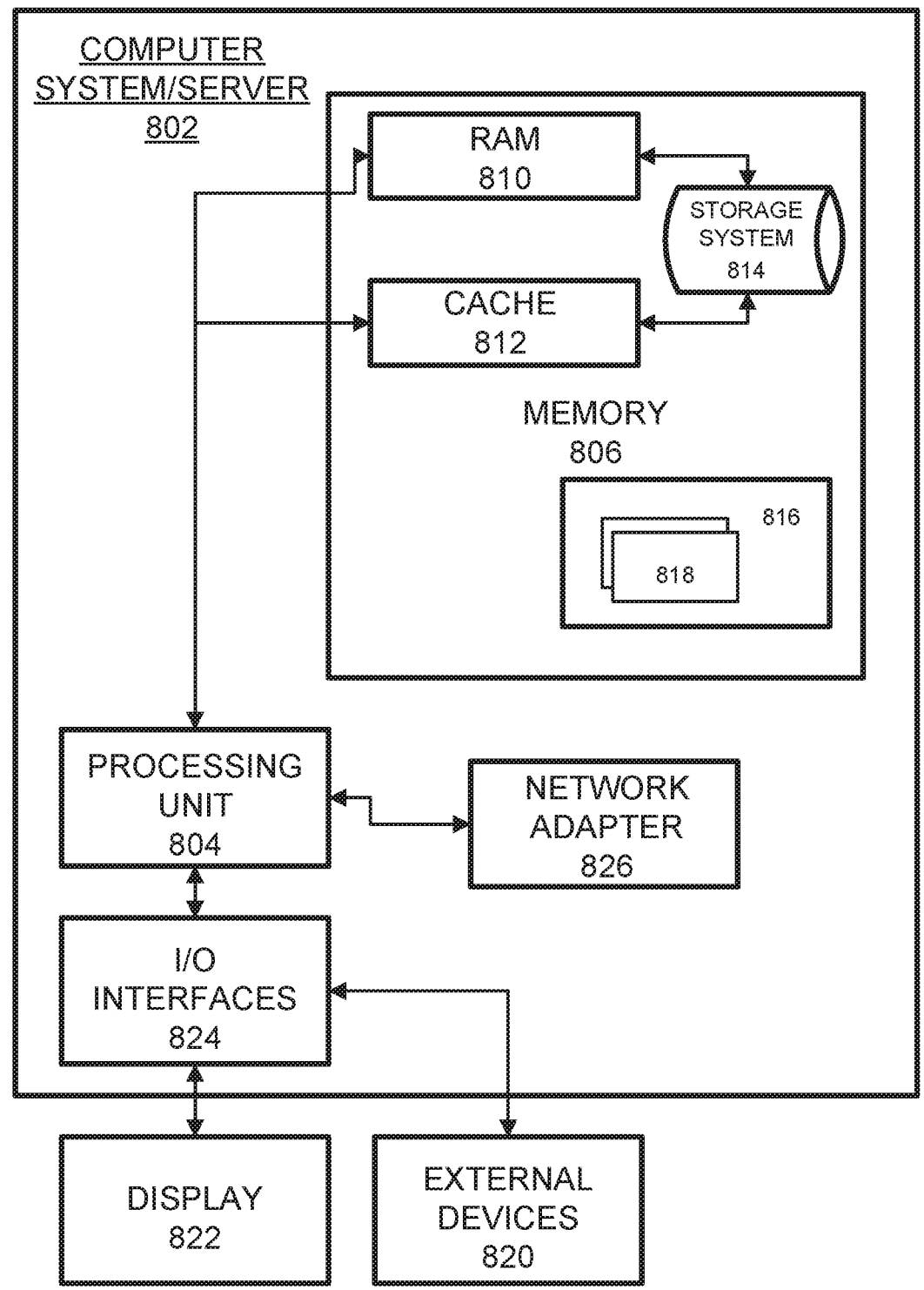
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to:

microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A device, comprising:
   a plurality of parts communicatively interconnected as component peers in a blockchain network, wherein in response to a transaction request received from a component peer, of the plurality of component peers, the component peers are configured to one or more of:
   generate and endorse a transaction to replace a part of the plurality of parts; and
   generate and endorse a transaction to reconfigure the device.

2. The system of claim 1, wherein the transaction to replace a part specifies a repair resource to replace the part with a replacement part, and
   wherein the component peers are further configured to:
   verify that the replacement part is compatible with the device;
   preconfigure the replacement part to operate in the device;
   determine that the repair resource is trusted by an owner of the device; and
   approve an identify and location of the repair resource.

3. The system of claim 2, wherein the component peers are configured to:
   authorize the repair resource to replace the part based on the determination that the repair resource is trusted.

4. The system of claim 3, wherein, when the component peers determine blockchain is determines that the replacement part is not compatible, the component peers are further configured to:
   remove the authorization for the repair resource to replace the part; and
   generate a notification.

5. The system of claim 2, wherein, when the component peers are configured to verify that the replacement part is compatible with the device, the component peers are further configured to:

verify that an electronic security certificate, associated with the replacement part and stored in a shared ledger of the blockchain network, designates that the replacement part is a valid replacement for the part.

6. The system of claim 2, wherein the component peers are further configured to:
receive, from the repair resource, a part completion transaction indicating that the part has been replaced with the replacement part;
endorse the part completion transaction; and
commit the part completion transaction to a shared ledger of the blockchain network.

7. The system of claim 2, wherein the component peers are further configured to:
inhibit operation of the device in response to the blockchain network detecting one or more of:
the replacement part malfunctioning or being inoperative;
the replacement part being incompatible with the device; and
the replacement part being identified as a used part provided as a new part.

8. A method, comprising:
receiving, by a blockchain network comprising a plurality of peers that are parts of a device, a request to replace a part of the device peer;
qualifying, by the plurality of peers, a replacement part for the part and a repair resource;
generating, by the plurality of peers, a part replacement transaction; and
endorsing, by the plurality of peers, the part replacement transaction to authorize the repair resource to replace the part with the second part.

9. The method of claim 8, wherein the part replacement transaction comprises:
an identification of the repair resource, and
wherein the method further comprises:
verifying that the replacement part is compatible with the device;
preconfiguring the replacement part to operate in the device;
determining that the repair resource is trusted by an owner of the device; and
approving a repair facility identification and location.

10. The method of claim 9, wherein the method further comprises:
authorizing the repair resource to replace the part based on the determination that repair resource is trusted.

11. The method of claim 10, further comprising:
determining that the replacement part is not compatible; and
in response to the determining that the replacement part is not compatible, the method further comprising:
removing the authorization for the repair resource to replace the part; and
generating a notification.

12. The method of claim 8, wherein the verifying that the replacement part is compatible with the device further comprises:
verifying that an electronic security certificate, associated with the replacement part and stored in a shared ledger of the blockchain network, designates that the replacement part is a valid replacement for the part.

13. The method of claim 9, wherein the method further comprises:

receiving, from the repair resource, a part completion transaction indicating that the part has been replaced with the replacement part;
endorsing the part completion transaction; and
committing the part completion transaction to a shared ledger of the blockchain network.

14. The method of claim 8, further comprising:
inhibiting operation of the device in response to the blockchain network detecting one or more of:
the replacement part malfunctioning or being inoperative;
the replacement part being incompatible with the device; and
the replacement part being identified as a used part provided as a new part.

15. A non-transitory computer readable medium comprising one or more instructions that when executed by one or more processors of a plurality of parts, of a device communicatively interconnected as component peers in a blockchain network configure the one or more processors of the components peers to perform:
receiving a request to replace a part of the device;
qualifying a replacement part for the part and a repair resource;
generating a part replacement transaction; and
endorsing the part replacement transaction to authorize the repair resource to replace the part with the second part.

16. The non-transitory computer readable medium of claim 15, wherein part replacement transaction comprises:
an identification of the repair resource, and
wherein the one or more instructions further configure the one or more processors of the component peers to perform:
verifying that the replacement part is compatible with the device;
preconfiguring the replacement part to operate in the device;
determining that the repair resource is trusted by an owner of the device; and
approving a repair facility identification and location.

17. The non-transitory computer readable medium of claim 16, wherein the one or more instructions further configure the one or more processors of the component peers to perform:
authorizing the repair resource to replace the part based on the determination that repair resource is trusted;
determining that the replacement part is not compatible; and
in response to the determining that the replacement part is not compatible, the processor is further configured to perform:
removing the authorization for the repair resource to replace the part; and
generating a notification.

18. The non-transitory computer readable medium of claim 15, wherein, when the one or more processors of the component peers are is configured to perform the verifying that the replacement part is compatible with the device, the one or more instructions further configure the one or more processors of the component peers to perform:
verifying that an electronic security certificate associated with the replacement part and stored in a shared ledger of the blockchain network designating that the replacement part is a valid replacement for the part.

19. The non-transitory computer readable medium of claim 16, wherein the one or more instructions further configure the one or more processors of the component peers to perform:
- receiving, from the repair resource, a part completion transaction indicating that the part has been replaced with the replacement part;
- endorsing the part completion transaction; and
- committing the part completion transaction to a shared ledger of the blockchain network.

20. The non-transitory computer readable medium of claim 15, wherein the one or more instructions further configure the one or more processors of the component peers to perform:
- inhibiting operation of the device in response to the blockchain network detecting one or more of:
- the replacement part malfunctioning or being inoperative;
- the replacement part being incompatible with the device; and
- the replacement part being identified as a used part provided as a new part.

* * * * *